United States Patent [19]
Bell

[11] Patent Number: 5,482,061
[45] Date of Patent: Jan. 9, 1996

[54] WASH SYSTEM

[76] Inventor: Jack W. Bell, 9371 Kiowa Trail, Chanhassen, Minn. 55317

[21] Appl. No.: 208,437

[22] Filed: Mar. 9, 1994

[51] Int. Cl.$^6$ ..................................................... B08B 3/02
[52] U.S. Cl. ..................... 134/56 R; 134/111; 134/172; 134/169 A; 210/526
[58] Field of Search .................... 134/172, 111, 134/169 A, 105, 108, 56 R, 57 R, 58 R; 210/242.3, 526

[56] References Cited

U.S. PATENT DOCUMENTS

| | | | |
|---|---|---|---|
| 3,522,814 | 8/1970 | Olson | 134/111 |
| 3,890,988 | 6/1975 | Lee | 134/111 |
| 4,056,114 | 11/1977 | Boutillette | 134/111 |
| 4,105,342 | 8/1978 | Plourde | 134/111 X |
| 4,128,478 | 12/1978 | Metzger | 134/111 X |
| 4,462,415 | 7/1984 | Otzen | 134/111 |
| 4,464,256 | 8/1984 | Plourde | 134/111 |
| 4,652,372 | 3/1987 | Threadgill | 210/526 |
| 5,015,378 | 5/1991 | Lewan | 210/526 |
| 5,303,725 | 4/1994 | Hilgren | 134/111 |
| 5,368,653 | 11/1994 | Russell | 134/111 |

*Primary Examiner*—Frankie L. Stinson
*Attorney, Agent, or Firm*—Hugh D. Jaeger

[57] ABSTRACT

A wash system using a biodegradable chemical in a water solution for the degreasing of items such as automobile parts, machine parts or medical parts. The fluid is recirculated, can be heated, is filtered and any oils or greases lighter than water are separated and reclaimed from the top of the solution. The solution is held in a reservoir tank pumped through a filter and a goose neck pipe to a nozzle in the sink. The oils or greases are removed by a skimming system into flexible tubing which empties into buckets for later recycling. The filter removes particles, metal filings and is recycled as scrap metal.

1 Claim, 4 Drawing Sheets

5,482,061

WASH SYSTEM

CROSS REFERENCES TO CO-PENDING APPLICATIONS

None.

BACKGROUND OF THE INVENTION

1. Field of the Invention

The present invention pertains to a wash system, and more particularly, pertains to a wash system such as for automobile parts, machine tool parts and degreasing any type of item.

2. Description of the Prior Art

Prior art degreasers have utilized a fluid such as mineral spirits or specialty fluids which have to be handled and treated as hazardous waste when spent. Disposing of these types of fluids is usually done under a contract basis and is expensive as well as placing the user under strict liability for the disposition of the cleaning fluid with the waste contained in the cleaning fluid.

Present invention overcomes the disadvantages of the prior art wash systems by providing a wash system using a biodegradable fluid which can be reclaimed on site by the equipment disclosed herein with the separated petroleum residue being managed by beneficial reuse as a secondary fuel, and the particulate captured by the filter being recycled as scrap metal.

SUMMARY OF THE INVENTION

The general purpose of the present invention is a wash system which utilizes a biodegradable chemical mixed in water forming a degreasing solution.

According to one embodiment of the present invention, there is provided a tank reservoir on the base and a sink with a hinged lid which mounts on the tank reservoir. A support panel on the tank reservoir supports an oil or grease extractor, a low fluid pump, and an immersion heater. A fluid filter which is a type commonly available from automobile parts stores mounts on the rear of the sink. A submersion pumps rests on the bottom of the tank reservoir and is piped to a goose neck nozzle in the washing sink through the filter. A drain is provided in the washing sink for draining the solution to the tank reservoir. The oil or grease separated from the chemical detergent empties into a container which rests on the base and can be easily reclaimed for later beneficial reuse.

One significant aspect and feature of the present invention is a wash system which utilizes aqueous based cleaner/degreaser which is biodegradable and can be continuously recycled on-site.

Another significant aspect and feature of the present invention is the separation of particles and other particulates through a standard oil filter employed in combustion engines which, when the filter requires replacement as needed, can be recycled as scrap metal and oils or greases are skimmed off into a container which can be collected for later beneficial reuse as a secondary fuel.

A further significant aspect and feature of the present invention is a system which is environmentally safe and cost effective to operate in locations such as in industrial settings and automobile repair shops, eliminating the management of spent cleaner solution as a hazardous waste.

Having thus described embodiments of the present invention, it is the objects hereof to provide a wash system, (i) which uses an aqueous based cleaner/degreaser; (ii) skimming the surface of the solution in the tank reservoir to remove oils and greases; and (iii) filtering of the solution as it is being reused, such that the aqueous based cleaner/degreaser can be continuously recycled on site; (iv) the petroleum residue captured by the skimmer can be beneficially reused as a secondary fuel; and (v) the filter can be recycled as scrap metal.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
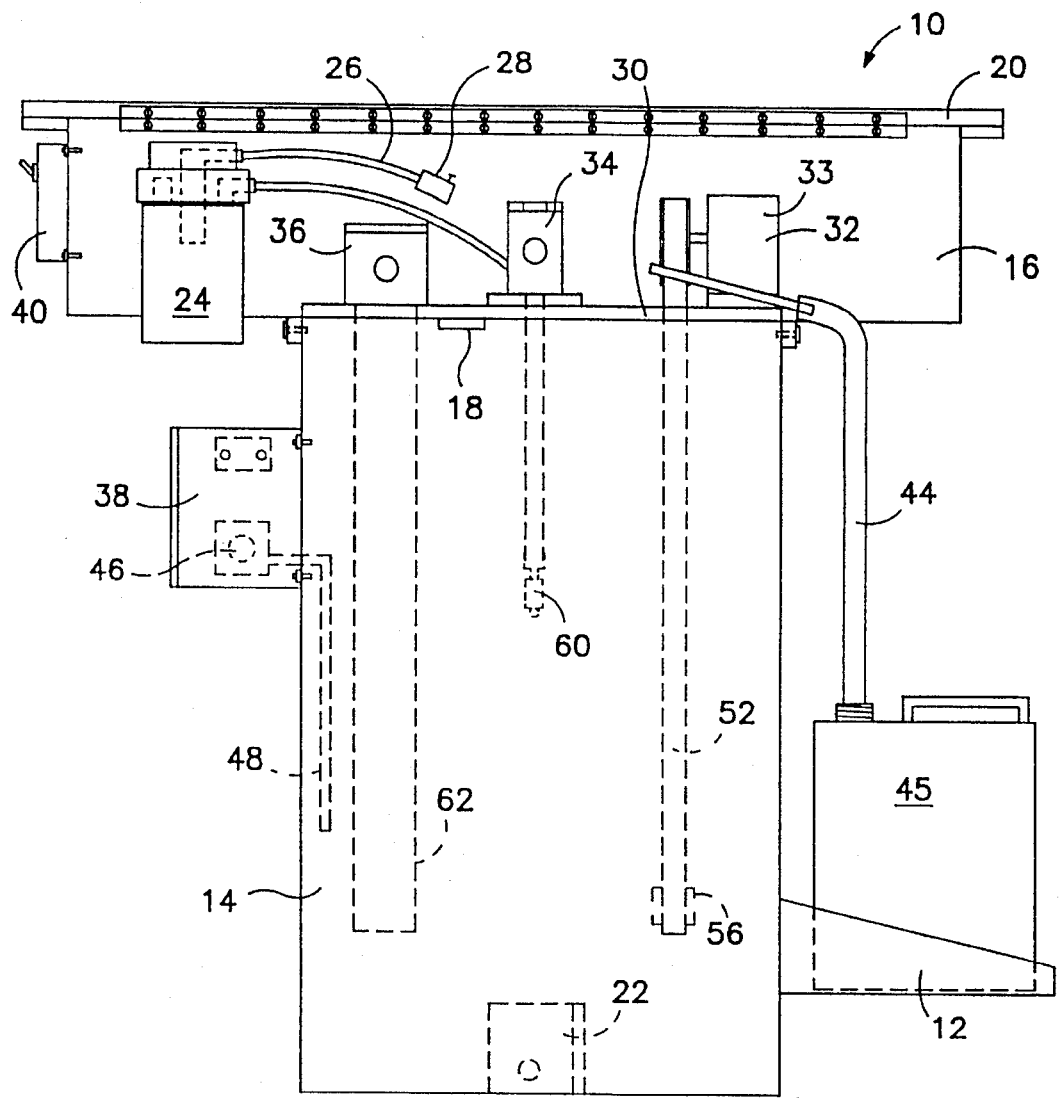
FIG. 1 illustrates a rear view of the wash system, the present invention.

FIG. 1 illustrates a rear view of a wash system 10, the present invention, including a base 12 for a reservoir tank 14, a sink 16 with a drain 18, and a hinged lid 20. Pump 22 rests on the base of the reservoir tank 14. Filter 24 mounts on the rear of the sink 16 and connects to a goose neck pipe 26 with a nozzle 28. Support panel 30 on the reservoir tank 14 supports from right to left, an oil skimmer 32, a liquid level sensor 34, and a heater 36. An electrical junction box 38 resides on the side of the reservoir tank 14. A switch 40 resides on the side of the sink 16. A tubing 44 extends from the oil skimmer 32 to a container 44 on the base 12. The sink 16 bolts onto tank 14.

Figure 2:
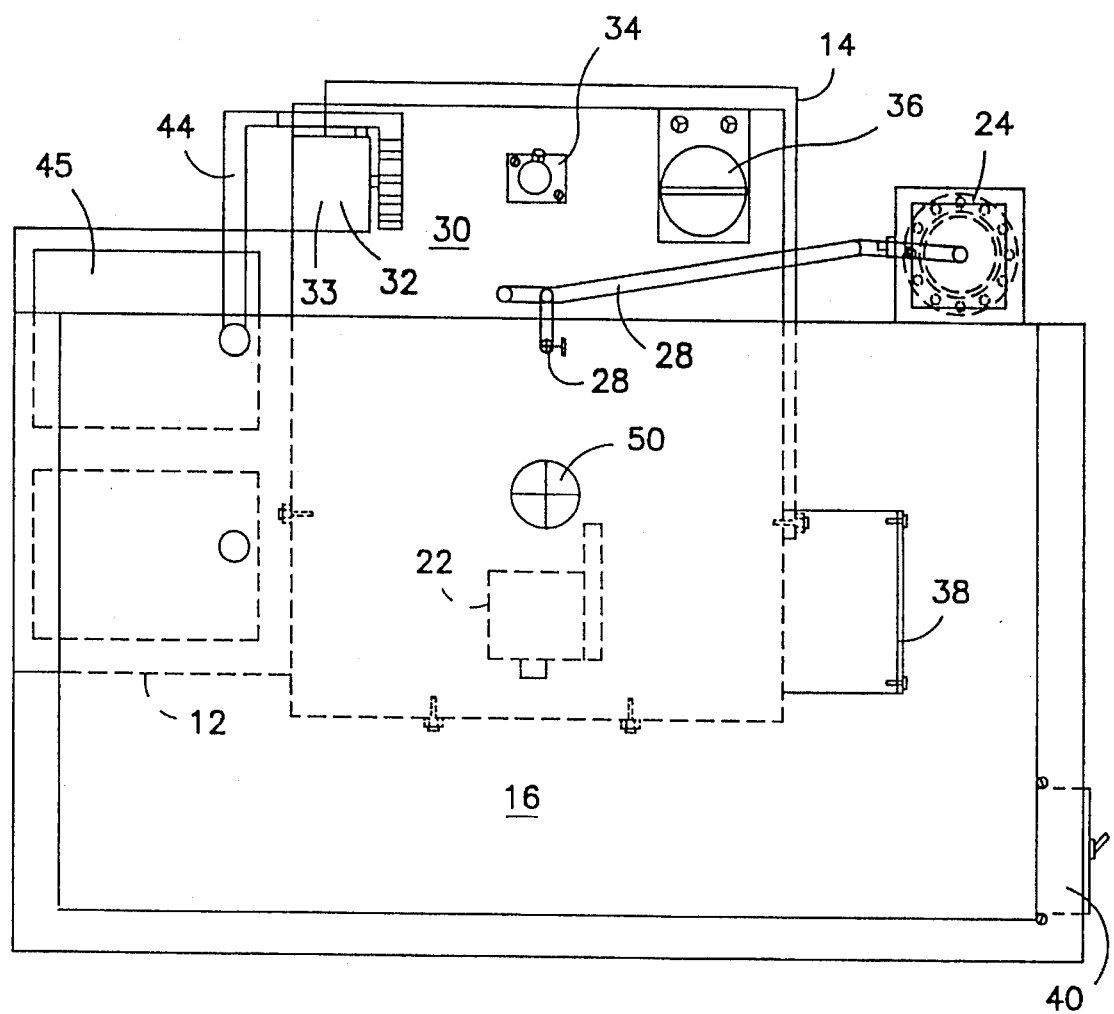
FIG. 2 illustrates a top view.

FIG. 2 illustrates a top view where all numerals correspond to those elements previously described.

Figure 3:
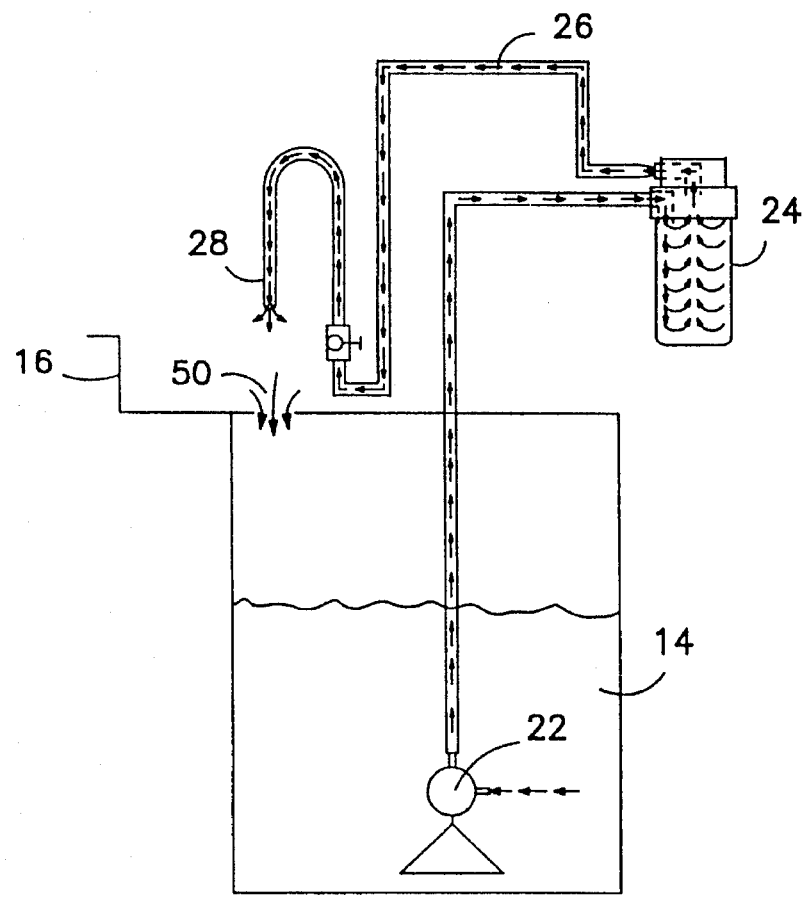
FIG. 3 illustrates a fluid flow diagram.

FIG. 3 illustrates a fluid flow diagram of the solution from the tank reservoir through the filter and through the goose neck to the nozzle. The filter can be any suitable spin on filter such as that purchased at an automobile parts store. The figure traces the flow of the solution from the submersible pump in the tank reservoir through the filter, through the nozzle, through the drain and back into the tank reservoir.

Figure 4:
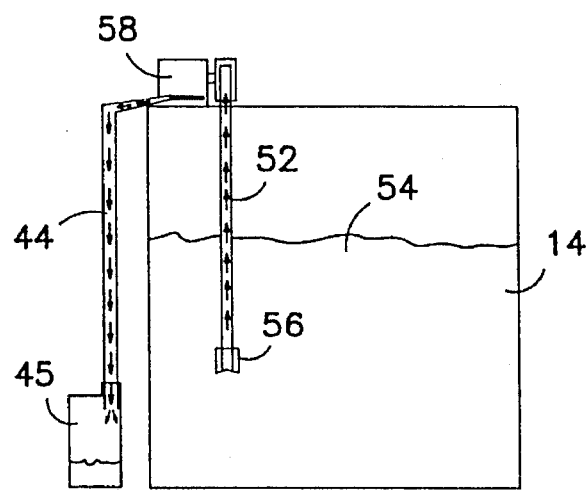
FIG. 4 illustrates the oil and grease skimmer.

FIG. 4 illustrates a fluid flow diagram of oil and greases being skimmed by a polyethylene belt suspended in the solution on a bearing and driven by a skimmer motor which solution is then scraped and piped to a container at the base for later disposal.

Figure 5:
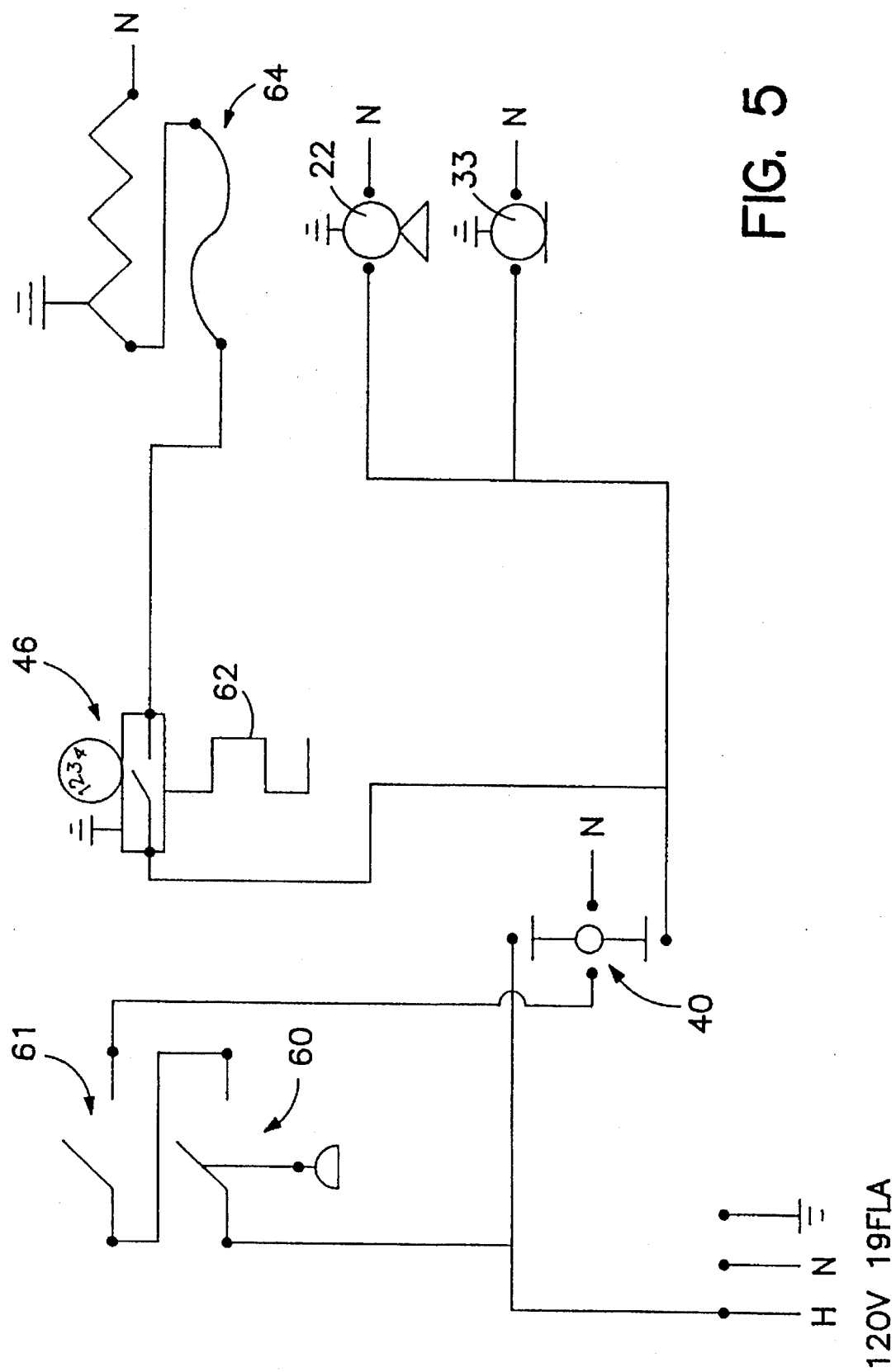
FIG. 5 illustrates an electrical circuit diagram.

FIG. 5 illustrates an electrical circuit schematic diagram for an on/off switch, a liquid level switch, a thermostat, an immersion heater, an over temperature fuse, the pump and the skimmer, where all numerals correspond to those elements previously described.

MODE OF OPERATION

The aqueous based cleaner degreaser, U.S. Pat. No. 5,264,158, dated Nov. 23, 1993, is mixed with water and is poured into the tank reservoirs or the sink. Operation occurs by turning on the pump. Filtering occurs at the drain for large particles and at the filter for smaller particles. The filter is treated as scrap metal. The belt is 1"×60" polyurethane.

The motor speed is 7 rpm. The filter is 25 micron, 3¾"×8⅜".

Various modifications can be made to the present invention without departing from the apparent scope hereof.

I claim:

1. A parts washing system comprising:
   a. base member on a floor;
   b. a large tank reservoir secured on said base member and including an electrical resistance heater extending into said tank, and a thermostat control means connected between a power source and said electrical resistance heater for maintaining a predetermined temperature in said large tank reservoir;
   c. a rectangular sink on said large tank reservoir for washing parts and including a central drain emptying into said large tank reservoir;
   d. an aqueous based cleaner/degreaser with water forming a solution in said large tank reservoir and heated by said electrical resistance heater;
   e. a submersible pump submerged in said large tank reservoir and connected to said power source;
   f. a flexible nozzle mounted to said rectangular sink and connected to said sump pump by a hose;
   g. a disposable screw-on filter for capturing particulate, metal filings from the solution connected between said sump pump and said flexible nozzle; and,
   h. a belt driven grease and oil skimmer mounted on one side of said large tank reservoir through a hole in said large tank reservoir and including a belt circulating through said solution and a scraper for scraping said belt to remove any contaminates for recycling, whereby a process for washing a greasy item in the rectangular sink includes filling said large tank reservoir with said aqueous based cleaner/degreaser and water constituting the solution, pumping with the submersible pump from said large tank reservoir through the filter into the nozzle above the sink, draining said solution from the sink into said large tank reservoir, skimming grease and oil from said solution from said tank reservoir into a container adjacent said tank reservoir by the belt, reclaiming the skimmed grease and oil for recycling, and recycling the screw-on filter as scrap metal.

* * * * *